(12) United States Patent
Biset et al.

(10) Patent No.: US 9,902,126 B2
(45) Date of Patent: Feb. 27, 2018

(54) COMPOSITE PREFORMS WITH SUPPLEMENTAL LOAD BEARING PLIES

(71) Applicant: Rohr, Inc., Chula Vista, CA (US)

(72) Inventors: Charles Michael Biset, San Diego, CA (US); Christian Soria, La Mesa, CA (US)

(73) Assignee: ROHR, INC., Chula Vista, CA (US)

( * ) Notice: Subject to any disclaimer, the term of this patent is extended or adjusted under 35 U.S.C. 154(b) by 164 days.

(21) Appl. No.: 14/691,862

(22) Filed: Apr. 21, 2015

(65) Prior Publication Data

US 2016/0311195 A1  Oct. 27, 2016

(51) Int. Cl.
| | |
|---|---|
| *B32B 5/12* | (2006.01) |
| *B32B 5/02* | (2006.01) |
| *B32B 3/26* | (2006.01) |
| *B29B 11/16* | (2006.01) |
| *B29C 70/24* | (2006.01) |
| *B32B 5/26* | (2006.01) |
| *B32B 1/00* | (2006.01) |
| *B64C 1/00* | (2006.01) |

(52) U.S. Cl.
CPC ............... *B32B 5/12* (2013.01); *B29B 11/16* (2013.01); *B29C 70/24* (2013.01); *B32B 3/26* (2013.01); *B32B 5/024* (2013.01); *B32B 1/00* (2013.01); *B32B 5/02* (2013.01); *B32B 5/26* (2013.01); *B32B 2260/021* (2013.01); *B32B 2260/023* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2305/08* (2013.01); *B32B 2605/18* (2013.01); *B64C 1/00* (2013.01)

(58) Field of Classification Search
CPC ........................................................ B32B 5/12
USPC ........................................................ 428/113
See application file for complete search history.

(56) References Cited

U.S. PATENT DOCUMENTS

| | | | | |
|---|---|---|---|---|
| 5,545,455 | A * | 8/1996 | Prevorsek | ............. F41H 5/0485 2/2.5 |
| 6,991,124 | B1 * | 1/2006 | Palley | .................... B65D 88/14 220/1.5 |
| 2002/0038687 | A1 * | 4/2002 | Anderson | ........... B29C 65/5042 156/275.7 |

\* cited by examiner

*Primary Examiner* — Brent O'Hern
(74) *Attorney, Agent, or Firm* — Snell & Wilmer, L.L.P.

(57) ABSTRACT

A fiber preform is provided. The fiber preform may comprise a base including a fiber weave with a plurality of fibers oriented in three directions. A plurality of legs may extend a first height from the base and include a fiber weave with the plurality of fibers oriented in three directions. A fiber reinforcement may be disposed proximate the legs with a second height equal to the first height. The fiber reinforcement may comprise a first ply and a second ply oriented orthogonal to the first ply in a plane parallel to the legs.

15 Claims, 5 Drawing Sheets

COMPOSITE PREFORMS WITH SUPPLEMENTAL LOAD BEARING PLIES

FIELD OF INVENTION

The present disclosure relates to composite panel flanges, and, more specifically, to preforms with supplemental plies for bearing.

BACKGROUND

Composite materials may have various advantageous properties over conventional metal materials. In particular, composite materials may be lighter than metals such as aluminum. However, composites may be less structurally effective than metals when loaded under conditions which induce out-of-plane stresses. For example, aerospace applications for composites may subject components to high combined bending and tension loads. For example, an inner fixed structure (IFS) may be made from a composite material and disposed about a gas turbine engine as part of a thrust reverser. The IFS may be coupled to other structures using bolts or rivets disposed through a flange protruding from the composite structure. A typical composite structure coupled using an integral composite flange may be predisposed to undesired flexion and/or bending. Conventional composite layup techniques using a stack-up of 2-D woven composite layers are not ideal for sustaining high combined pull-off and bending loads which induce high flatwise tension and shear at the base, where the flange integrates to the main composite structure.

SUMMARY

A fiber preform may comprise a base including a fiber weave with a plurality of fibers oriented in three directions. The three directions include a 2-D 0/90 degree weave with an interlocking third weave through the thickness of the planer 0/90 weave. A plurality of legs may extend as a continuation of the three dimensional weave a first height from the base. A fiber reinforcement may be disposed proximate the legs with a second height equal to the first height. The fiber reinforcement may be utilized to increase fastener load (bearing, shear, etc.) capability along with adding extra stiffness for increased bending load capability.

In various embodiments, the fiber reinforcement may comprise a first ply oriented at positive 45° and a second ply oriented at negative 45° on a parallel plane relative to 0/90 weave plane on the legs. A resin may be disposed in the base, the legs, and the fiber reinforcement. The resin in the legs and the fiber reinforcement may be cured to form an integral flange. The fiber reinforcement may be disposed between the legs. The fiber reinforcement may be disposed outside the legs. The plurality of fibers may include least one of a plurality of carbon fibers or a plurality of glass fibers.

A composite aircraft component may comprise a base including a fiber weave with a plurality of fibers oriented in three directions. A plurality of legs may extend a first height from the base. A fiber reinforcement may be proximate the legs with a second height equal to the first height.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact.

Components on aircrafts may be coupled together by placing fasteners through flanges. For example, nacelle or wing surfaces may be coupled using a flange and fastener interface. Composite components may be formed using a preform with fibrous material in a suitable shape, for example, with a flange extending from the preform. The legs may be reinforced with fibrous material and cured with resin to enhance pull-off and bending resistance of the flange.

Figure 1:
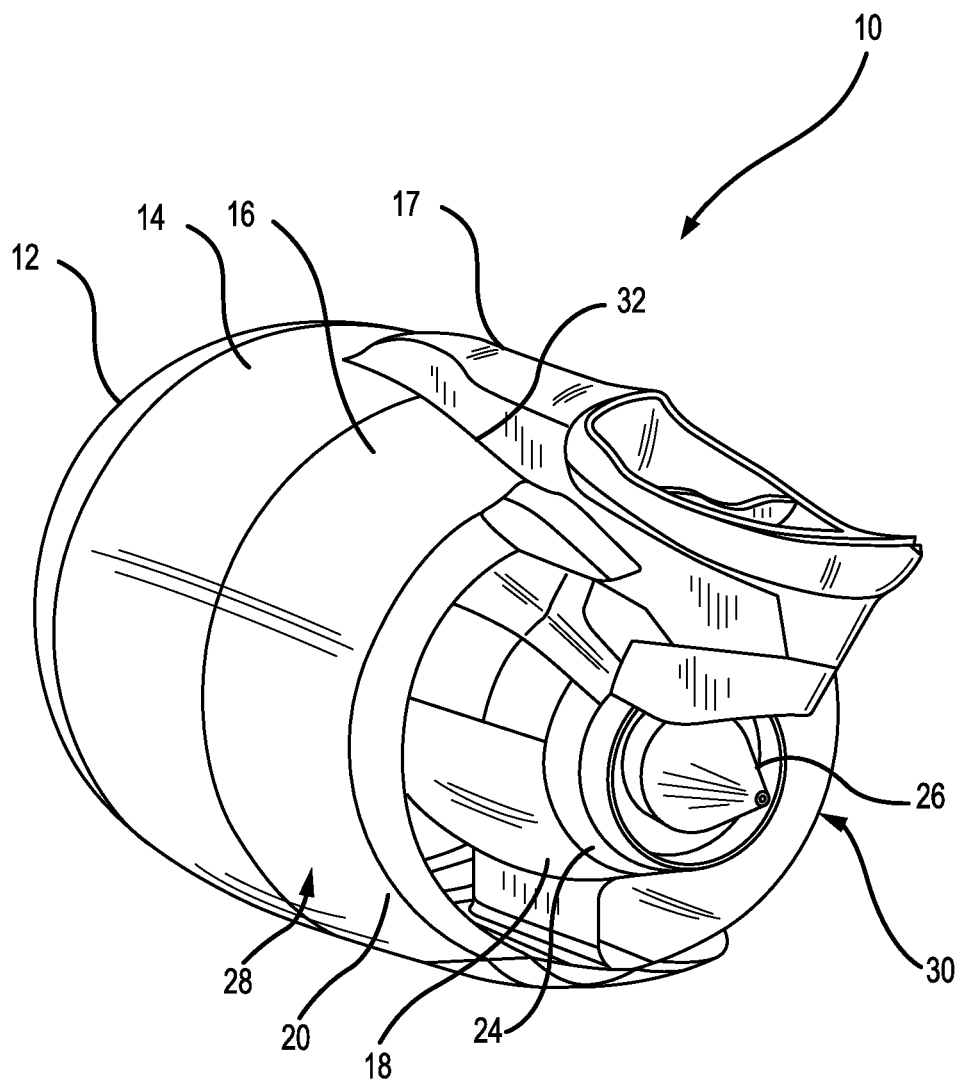
FIG. 1 illustrates a perspective view of a nacelle for an aircraft, in accordance with various embodiments.

Referring to FIG. 1, a nacelle 10 for a gas turbine engine is illustrated according to various embodiments. Nacelle 10 may comprise an inlet 12, a fan cowl 14, and a thrust reverser 16. Nacelle 10 may be coupled to a pylon 17, which may mount the nacelle 10 to an aircraft wing or aircraft body. Thrust reverser 16 may comprise an inner fixed structure ("IFS") 18 and an outer fixed structure ("OFS") 20.

Bypass air from an engine fan may flow in a generally annular bypass air duct defined between the IFS 18 and the OFS 20. The IFS 18 may be formed together with or be coupled to, at its aft end, a core cowl 24, which in turn is adjacent to an exhaust nozzle 26 through which flows core engine exhaust air. The thrust reverser 16 may further be split into a left half 28 and a right half 30, such that there is, for example, a left half and a right half of IFS 18. The left half 28 and the right half 30 may be hinged to the pylon 17 at hinges 32. The left half 28 and the right half 30 may hinge open at hinges 32 in order to provide access to the engine for inspection or servicing. The left and right halves of the IFS 18 may together help form a core compartment around the engine when the left and right halves 28, 30 of the thrust reverser are closed.

In various embodiments, components of nacelle 10 (or other aerostructures in an aircraft, for example, an inlet inner barrel, an inlet outer barrel, or another structure joined by a composite flange) may comprise reinforced composite flanges for coupling the components to other structures. For example, an IFS 18 may comprise a reinforced composite flange coupled to composite structures, metallic structures, and/or other structures using fasteners (e.g., rivets or bolts) disposed through a reinforced composite flange. As discussed in further detail below, the flange of the IFS may be reinforced by additional fibrous material to enhance the strength of the IFS and limit undesired flexion. The fibrous material for reinforcement may be oriented in different directions than other fibers in IFS 18 (or any composite aerostructure component).

Figure 2:
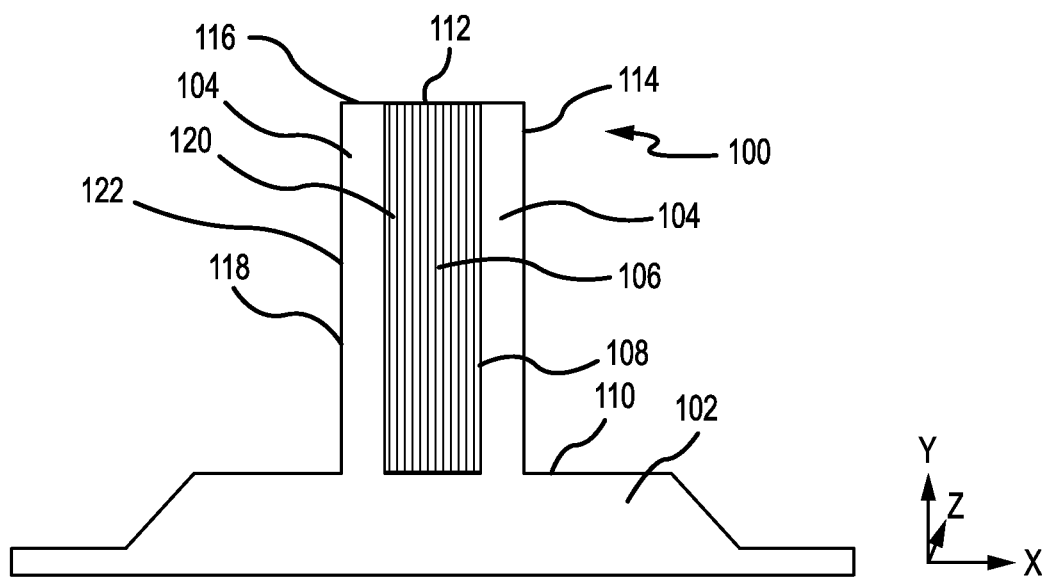
FIG. 2 illustrates a composite structure using a composite pi preform comprising fiber reinforcement between legs, in accordance with various embodiments.

With reference to FIG. 2, a preform 100 with base 102 and integral legs 104 extending away from surface 110 of base 102, in accordance with various embodiments. Legs 104 may be spaced apart with room for reinforcement or support between legs 104 (i.e., inside legs 104). Base 102 and legs 104 may be made at least partially from fibrous material. Fibers making up legs 104 and base 102 may be carbon fibers in a carbon-fiber weave or glass fibers in a glass-fiber weave, for example. In various embodiments, the fibrous material making up legs 104 and base 102 may comprise glass, aramid, polyethylene, boron, and/or silicon carbide.

In various embodiments, base 102 and legs 104 may be fiber preformed in substantially 2.5 dimensional (2.5D) or three dimensional (3D) weaves and/or braids. In that regard, base 102 and legs 104 may comprise fibers woven in three orthogonal directions. The three directions include a 2-D 0/90 degree weave with an interlocking third weave through the thickness of the planer 0/90 weave. Relative to the xyz axes provided for reference, base 102 and legs 104 may comprise a set of fibers oriented in the x direction, a set of fibers oriented in the y direction, and a set of fibers oriented in the z direction. While fibers may bend in various directions to weave together, the three sets of fibers making up base 102 and legs 104 may be oriented substantially orthogonally to one another. Also, the fibers that make up legs 104 are continuous extensions of the fibers that make up base 102.

In various embodiments, fiber reinforcement 106 may be disposed between legs 104 and fill space between legs 104. Fiber reinforcement 106 may be double ply reinforcement. Fiber reinforcement 106 may be the same type of fiber that makes up legs 104 and/or base 102. For example, fiber reinforcement 106 may be a carbon fiber if legs 104 are carbon fiber. Fiber reinforcement 106 may have two groups of fibers with an orientation to of positive and negative 45 degrees on a plane parallel to the plane of the legs (i.e., the y-z plane). In that regard, fiber reinforcement 106 is a 2D weave with fibers oriented in substantially orthogonal directions (i.e., plain weave). Fiber reinforcement 106 may be disposed between legs 104 and in contact with base 102 between legs 104. Fibers in fiber reinforcement 106 may be oriented in a different direction than the fibers comprising base 102 and legs 104 to provide supplemental strength in flange 108.

In various embodiments, fiber reinforcement 106, legs 104, and base 102 may be arranged before adding resin 120 to form flange 108 with fiber reinforcement 106, legs 104, and base 102 formed integrally. Resin 120 may be added to fibers 122 and permeate between fibers 122. Preform 100 may then be cured in an autoclave in the desired shape. Although flange 108 is depicted as being orthogonal to base 102, flange 108 may be oriented at a non-orthogonal angle with base 102. Legs 104 and fiber reinforcement 106 of flange 108 may extend in the z direction as surfaces with a uniform contour such that the depiction in FIG. 2 may be a cross section taken along the xy plane.

In various embodiments, legs 104 of flange 108 may have a uniform thickness such that legs 104 and flange 108 are symmetric about a central line in the y direction. As illustrated, the right surface 114 of flange 108 and the left surface 118 of flange 108 may be the outer surfaces of legs 104. Legs 104 may extend from surface 110 of base 102 to upper surface 116. Fiber reinforcement 106 may extend from surface 110 of base 102 to surface 112 of fiber reinforcement 106. Upper surface 116 and surface 112 may be a same distance (i.e., height H) from surface 110 in the y direction such that legs 104 and fiber reinforcement 106 have a similar length in the y direction. In that regard, both legs 104 and fiber reinforcement 106 may extend the entire length of flange 108 in the y direction. Flange 108 may provide a protruding body to join a composite component made with an integral flange by using preform 100 to another structure.

Figure 3:
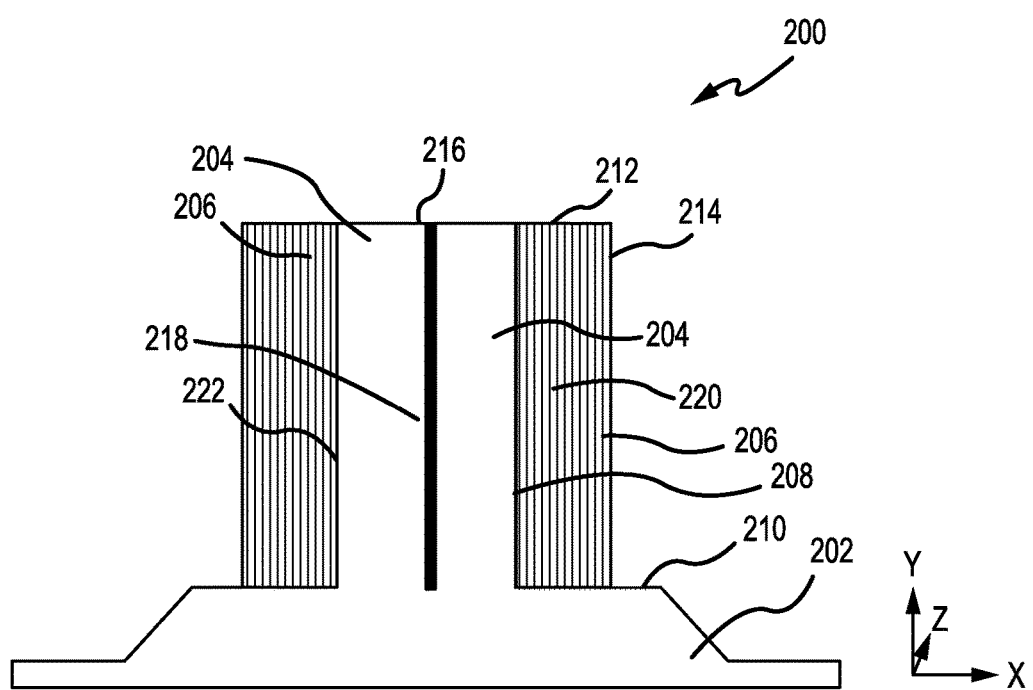
FIG. 3 illustrates a composite structure using a composite pi-shaped preform comprising fiber reinforcement outside two adjacent legs, in accordance with various embodiments.

With reference to FIG. 3, a preform 200 with base 202 and integral legs 204 extending away from surface 210 of base 202, in accordance with various embodiments. Legs 204 may be disposed adjacent one another with no room for filler or support between legs 204. Two legs 204 may have uniform thickness along the x axis and be symmetric to one another. Legs 204 may contact one another at surface 210 or otherwise be proximate one another. Base 202 and legs 204 may be made at least partially from fibers. Fibers making up legs 204 and base 202 may be carbon fibers in a carbon-fiber weave or glass fibers in a glass-fiber weave, for example. In various embodiments, the fibers making up legs 204 and base 202 may comprise glass, carbon, aramid, polyethylene, boron, silicon carbide and/or other fibrous material.

In various embodiments, base 202 and legs 204 may be fiber preformed 2.5-D or 3-D weaves and/or braids. In that regard, base 202 and legs 204 may comprise a fibrous material with fibers woven in three directions. Relative to the xyz axes provided for reference, base 202 and legs 204 may comprise a set of fibers oriented in the x direction, a set of fibers oriented in the y direction, and a set of fibers oriented in the z direction. While fibers may bend in various directions to weave together, the three sets of fibers making up base 202 and legs 204 may be oriented substantially orthogonally to one another. Also, the fibers that make up legs 204 are continuous extensions of the fibers that make up base 202.

In various embodiments, fiber reinforcement 206 may be disposed outside adjacent legs 204 on both sides of legs 204 with fiber reinforcement 206 symmetric on both sides of flange 208 and forming an outer surface of flange 208. Fiber reinforcement 206 may be the same type of fiber that makes up legs 204 and/or base 202. For example, fiber reinforcement 206 may be a carbon fiber if legs 204 are carbon fiber. Fiber reinforcement 206 may have two groups of fibers with an orientation to of positive and negative 45 degrees on a plane parallel to the plane of the legs (i.e., the y-z plane). In that regard, fiber reinforcement 206 is a 2 dimensional weave with fibers oriented in two substantially orthogonal directions (i.e., plain weave). Fiber reinforcement 206 may be disposed between legs 204 and in contact with base 202 between legs 204. Fibers in fiber reinforcement 206 may be oriented in a different direction than the fibers comprising base 202 and legs 204 to provide supplemental strength in flange 208.

In various embodiments, fiber reinforcement 206, legs 204, and base 202 of preform 200 may be arranged before adding resin 220 to form flange 208 with fiber reinforcement 206, legs 204, and/or base 202 sewn, woven, or otherwise coupled together. Resin 220 may be added to fibers 222 and permeate between fibers 222. Preform 200 may then be cured in an autoclave in the desired shape. Although flange 208 is depicted as being orthogonal to base 202, flange 208 may also be oriented at a non-orthogonal angle with base 202. Legs 204 and fiber reinforcement 206 of flange 208 may extend in the z direction as surfaces with a uniform contour such that the depiction in FIG. 3 may be a cross section taken along the xy plane.

In various embodiments, legs 204 of flange 208 may have a uniform thickness such that legs 204 and flange 208 are symmetric about a central line in the y direction. Legs 204 may extend from surface 210 of base 202 to upper surface 216. Fiber reinforcement 206 may extend from surface 210 of base 202 to surface 212 of fiber reinforcement 206. Upper surface 216 and surface 212 may be a same distance (i.e., height H) from surface 210 in the y direction such that legs 204 and fiber reinforcement 206 have a similar length in the y direction. In that regard, both legs 204 and fiber reinforcement 206 may extend the entire length of flange 208 in the y direction. Flange 208 may provide a protruding body to join preform 200 to another structure.

Figure 4:
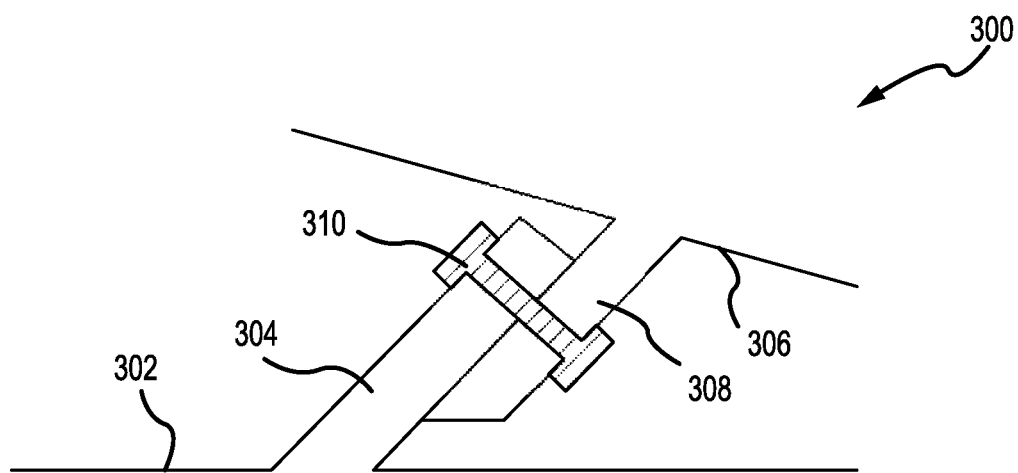
FIG. 4 illustrates a composite structure coupled to another structure using fasteners through a reinforced flange, in accordance with various embodiments.
Figure 5:
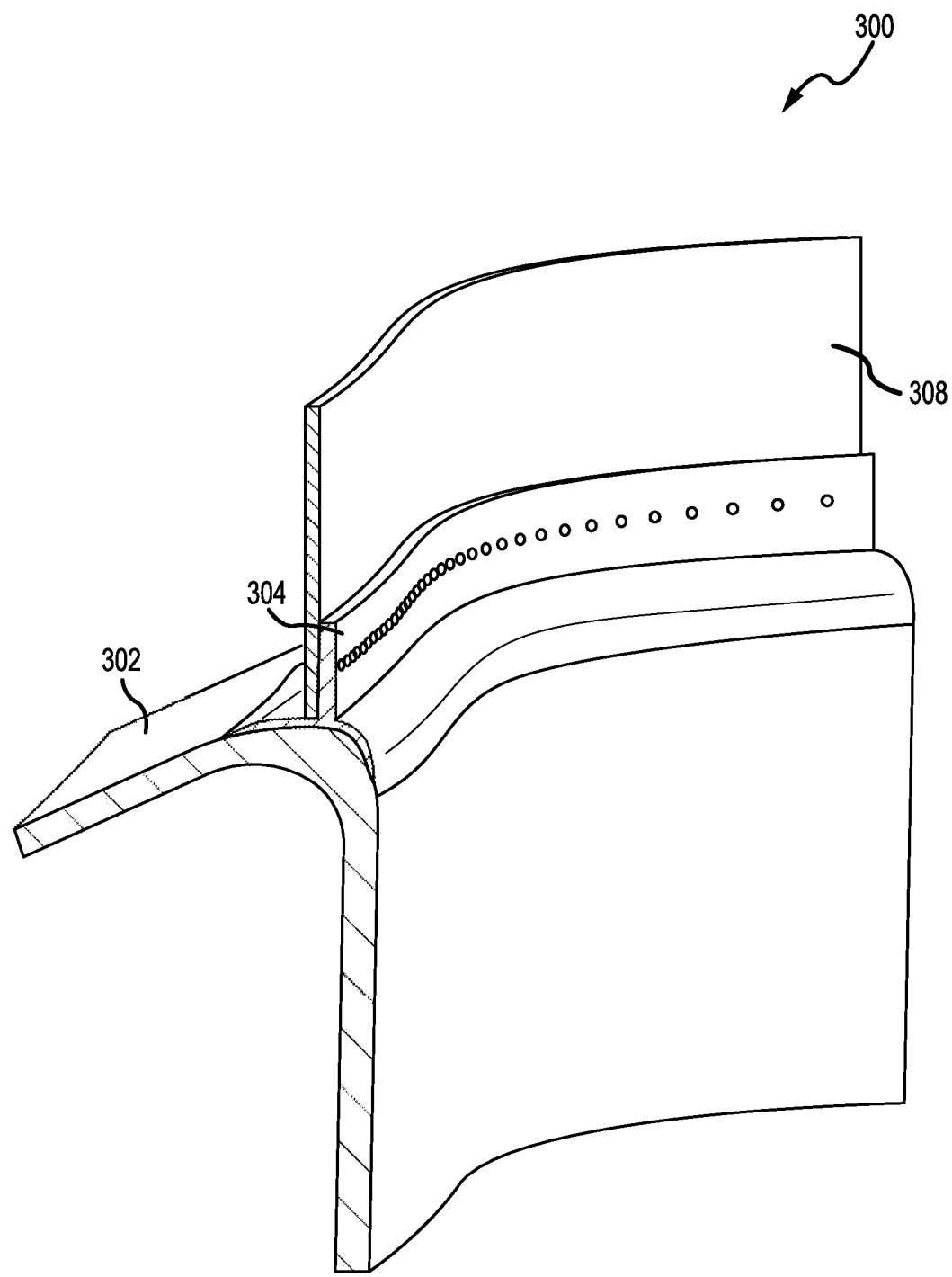
FIG. 5 illustrates a perspective view of a composite structure with a reinforced flange formed integrally to the composite structure, in accordance with various embodiments.

With reference to FIGS. 4 and 5, a multi-part structure 300 is shown with a composite structure 302 with a reinforced flange 304 coupled to a flange 308 of structure 306 using fastener 310. Composite structure 302 with reinforced flange 304 may be a composite structure with an integrally cured reinforced flange as illustrated in FIGS. 2 and 3. Composite structure 302 may be an aerostructure component such as an inlet inner barrel, an inlet outer barrel, a wing, a nacelle component, or any other composite component coupled using a flange. Structure 306 may be a metallic structure, a composite structure, or another solid structure with flange 308. Fastener 310 may be a bolt disposed through reinforced flange 304 and flange 308 to couple structure 306 to composite structure 302. Composite structure with reinforced flange (as illustrated in FIGS. 2 and 3) may provide increased stiffness and limit undesired flexion and/or bending in reinforced flange 304 and composite structure 302.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fiber preform, comprising:
   a base comprising a first fiber weave; and
   a flange extending from the base, the flange comprising,
      a) a first leg extending a first height from the base, the first leg comprising the first fiber weave with a first fiber oriented in a first direction, a second fiber oriented in a second direction orthogonal to the first direction, and a third fiber oriented in a third direction orthogonal to the first direction and the second direction, the first leg having a first surface extending orthogonally from the base, and
      b) a fiber reinforcement comprising a second fiber weave disposed proximate the first leg and having a second height equal to the first height, the second fiber weave comprising a fourth fiber and a fifth fiber oriented orthogonal to the fourth fiber, wherein the fourth fiber is oriented at a 45° angle relative to the first surface.

2. The fiber preform of claim 1, wherein the fourth fiber and the fifth fiber comprise at least one of a carbon fiber or a glass fiber.

3. The fiber preform of claim 1, further comprising a resin in the base, the first leg, and the fiber reinforcement.

4. The fiber preform of claim 1, wherein the first fiber weave comprises a three dimensional weave and the second fiber weave comprises a two dimensional weave.

5. The fiber preform of claim 1, wherein the flange further comprises a second leg extending from the base and wherein the fiber reinforcement is disposed between the first leg and the second leg.

6. The fiber preform of claim 1, wherein the flange further comprises a second leg extending from the base and wherein the fiber reinforcement is disposed outside the first leg and the second leg.

7. The fiber preform of claim 1, wherein the first fiber comprises at least one of a carbon fiber or a glass fiber.

8. A composite aircraft component, comprising:
   a base comprising a first fiber weave with a plurality of fibers oriented in a first direction, a second direction orthogonal to the first direction, and a third direction orthogonal to the first direction and the second direction; and
   a first flange extending from the base, the first flange comprising,
   a) a first leg extending a first height from the base, the first leg comprising the first fiber weave, the first leg having a first surface extending from the base and
   b) a fiber reinforcement comprising a second fiber weave disposed proximate the first and having a second height equal to the first height, wherein the second fiber weave comprises a plain weave oriented at a 45° angle relative to the first surface.

9. The composite aircraft component of claim 8, further comprising a resin in the base, the first leg, and the fiber reinforcement.

10. The composite aircraft component of claim 9, wherein the resin in the first leg and the fiber reinforcement is cured to enhance a bend resistance of the first flange.

11. The composite aircraft component of claim 8, further comprising a structure with a second flange, the second flange coupled to the first flange with a fastener disposed through the first flange and the second flange.

12. The composite aircraft component of claim 8, wherein the second fiber weave comprises at least one of a plurality of carbon fibers or a plurality of glass fibers.

13. The composite aircraft component of claim 8, wherein the first flange further comprises a second leg extending from the base and wherein the fiber reinforcement is disposed outside the first leg and the second leg.

14. The composite aircraft component of claim 8, wherein the plurality of fibers comprises at least one of a plurality of carbon fibers or a plurality of glass fibers.

15. The composite aircraft component of claim 8, wherein the first flange further comprises a second leg extending from the base and wherein the fiber reinforcement is disposed between the first leg and the second leg.

* * * * *